United States Patent Office 3,689,213
Patented Sept. 5, 1972

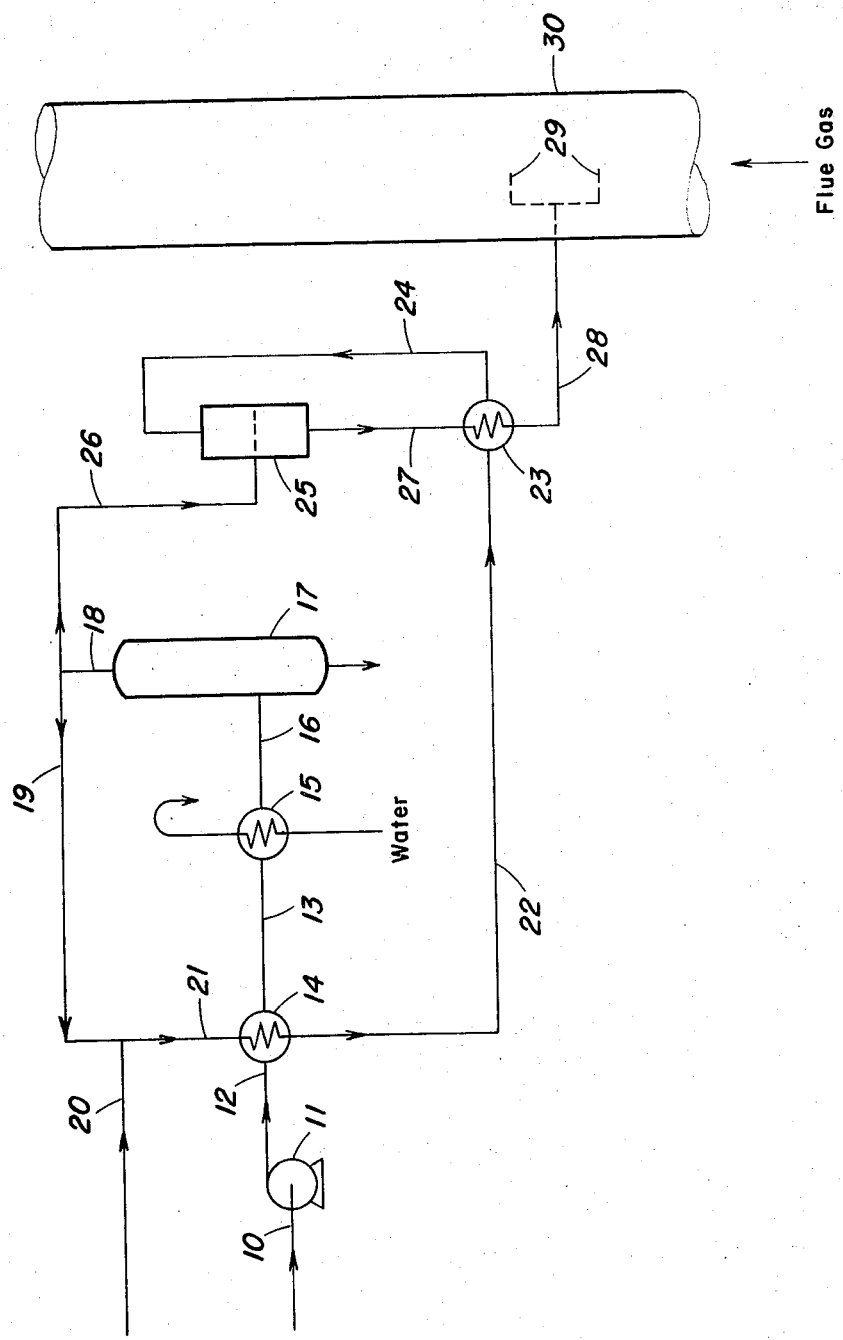

3,689,213
PROCESS FOR TREATING FLUE GASES
Salvatore A. Guerrieri, 19 Steepletop Road,
Rowayton, Conn. 06853
Filed Feb. 19, 1970, Ser. No. 12,761
Int. Cl. B01d 53/34; B03c 3/01
U.S. Cl. 55—5                                    2 Claims

ABSTRACT OF THE DISCLOSURE

Liquid sulfur dioxide is vaporized and admixed with an excess of compressed and dehumidified oxygen-containing gas. The mixture is introduced into a converter wherein the sulfur dioxide is converted to sulfur trioxide. The gaseous products from the converter are introduced into a flue gas, produced by the combustion of a low sulfur, solid fossil fuel, prior to the passage thereof through electrostatic precipitator means.

---

This invention relates to a method of treating flue gases, and more particularly to a method of treating flue gases produced during the combustion of fossil fuels to reduce the amount of fly ash suspended therein prior to venting the gases through an electrostatic precipitator into the surrounding atmosphere.

Electric power produced by public utilities is obtained from electric generators driven by steam turbines. The high pressure steam for driving such turbines is commonly obtained from steam plants fired with solid fossil fuels, such as coal. Generally, the fossil fuel introduced into the combustion chamber of the steam plant is in a pulverized state and combustion takes place while the fossile fuel is suspended in the combustion chamber gases. Since the fossil fuel particle are quite small, as well as the resulting ash particles, most of the ash passes out of the combustion chamber together with the gaseous products of combustion. Before being vented to the atmosphere, the flue gases pass through various separation devices, including electrostatic precipitators, to remove particulate matter thereby preventing their passage into the atmosphere.

The larger particles are easily removed by mechanical filters, however, the finer particles ranging about one micron in size which pass through the mechanical filters are expected to be removed in the electrostatic precipitators. For many fossil fuels, ash removal by this combination of devices has been highly satisfactory. However, low sulfur fossil fuels, such as the coals which are found in the western United States, produce an ash that does not satisfactorily respond to removal by electrostatic precipitators. In these cases collection efficiency may be only 65% instead of an expected 95+%.

It has been known that in many such cases, the performance of the electrostatic precipitators can be improved by the introduction of a small amount of sulfur trioxide ($SO_3$) into the flue gas prior to its entry into the electrostatic precipitators. Systems for introducing small amounts of sulfur trioxide into flue gases involve vaporizing liquid sulfur trioxide, superheating the vapor and subsequently injecting it into the flue gas either as a pure gas or mixed with dry air. Liquid sulfur trioxide is an extremely touchy chemical, highly corrosive and toxic, and consequently, extreme care must be exercised when transferring, storing and handling liquid sulfur trioxide. Liquid sulfur trioxide should be stored at a temperature between 86 to 95° F., and great care must be exercised when storing and handling to prevent the formation of solid sulfur trioxide. The boiling point of liquid sulfur trioxide is 111.2° F., and consequently temperatures above 111.2 F. must be avoided for high pressure build-up may rupture the container.

An object of this invention is to provide a novel process and apparatus for treating flue gases to remove fly ash more effectively by electrostatic precipitator means.

Another object of this invention is to provide a novel process and apparatus for injecting sulfur trioxide into a flue gas to facilitate removal of fly ash by electrostatic precipitator means.

Still another object of this invention is to provide a novel process and apparatus for injecting sulfur trioxide into a flue gas to facilitate removal of fly ash which process and apparatus eliminates the need to store and transfer large volumes of liquid sulfur trioxide and its concomitant problems of storage and handling.

A further object of this invention is to provide a novel automated process and apparatus for injecting sulfur trioxide into a flue gas to facilitate fly ash removal thereby requiring minimum amount of attention.

A still further object of this invention is to provide a novel process and apparatus for injecting sulfur trioxide into a flue gas by providing a system containing no liquid sulfur trioxide and so little sulfur trioxide to essentially eliminate the hazards associated with sulfur trioxide.

These and other objects of this invention will become more fully apparent from the following detailed description of the invention when read with reference to the accompanying drawing which is a schematic flow diagram of an embodiment of the process and apparatus of the invention.

Briefly in accordance with this invention, gaseous sulfur trioxide ($SO_3$) is generated in the immediate vicinity of point of use, as required by the quantity of fossil fuels being burned per unit time, and introduced into the flue gases at a predetermined rate to facilitate fly ash removal by electrostatic precipitator means. In this manner problems attendant with the storage and handling of liquid sulfur trioxide is eliminated by this invention.

Referring now to the drawing, air in line 10 is compressed in compressor 11 and passed through lines 12 and 13 through heat exchanger 14 and 15, respectively, to remove the heat of compression. The air withdrawn from heat exchanger 15 is passed through line 16 to dehumidifier 17 wherein the water content is substantially reduced, by contact with a suitable solvent, such as tri-ethylene glycol. Sulfuric acid may be used but its use would introduce additional problems of corrosion and safety. Such solvents permit continuous operation as compared with cyclic batch operations which would be necessary by use of desiccants. For certain applications, the dehumidifier may be omitted and replaced simply with a liquid entrainment removal means.

The thus dehumidified air is withdrawn from dehumidifier 17 through line 18 and a portion thereof is passed through line 19 and admixed with gaseous sulfur dioxide (by vaporizing liquid sulfur dioxide) in line 20. The gaseous mixture in line 21 is passed in indirect heat exchange relationship through exchanger 14 with the air in line 10, and thence through line 22 to heat exchanger 23 wherein the temperature of the gaseous mixture is raised to the temperature required to efficiently oxidize sulfur dioxide to sulfur trioxide, such as 750 to 930° F., preferably 780 to 960° F.

The gaseous mixture withdrawn from heat exchanger 23 is passed through line 24 to a converter 25 containing a suitable oxidation catalyst, such as vanadium oxide or platinum, wherein oxidation of sulfur dioxide to sulfur trioxide is effected, preferably with at least 90% conversion. The remaining portion of the dehumidified air from dehumidifier 17 is passed through line 26 into converter 25 to control the temperature therein. The use of air (substantially in excess of the quantity of air customarily used in sulfuric acid plants), an air-sulfur dioxide mixture containing less than about five (5) volume percent sulfur dioxide is generally contemplated, and consequently higher temperatures may be used than is normally economical in the manufacture of sulfuric acid. Advantages achieved, inter alia, by use of such an amount of excess air are: (1) substantially complete conversion of sulfur dioxide to sulfur trioxide; (2) longer equipment life by minimizing corrosion through the use of the combination of high temperature and extremely low partial pressure by avoiding sulfuric acid condensation; (3) maximum conversion conditions within the converter; and (4) more effective dispersion of sulfur trioxide in the flue gas.

Hot gaseous products including sulfur trioxide are withdrawn from converter 25 and passed via line 27 to heat exchanger 23 wherein the gaseous products are passed in indirect heat exchange. The gaseous products in line 27 are cooled but not to a temperature below the dew point of sulfuric acid, and are preferable at a temperature of at least 150° F. The gaseous products withdrawn from heat exchanger 23 are passed through line 28 to a distributor 29 positioned within a flue gas duct 30 upstream of an electrostatic precipitator (not shown). An important aspect of this invention is to maintain the temperature of the gaseous products passed to the distributor 29 at a temperature well above the dew point thereof [and of the flue gas into which the gaseous products are introduced] to avoid corrosion which would result from liquid sulfuric acid. The amount of sulfur trioxide in the system (i.e., between the converter 25 and flue gas inlet duct 30) preferably does not exceed the value given by the equation:

$$G = 1000 T^{0.5}$$

wherein G is the number of grains of sulfur trioxide therein and T is the number of pounds per hour of sulfur trioxide introduced into the flue gas.

The following example is illustrative of the invention, although the scope of the invention is not to be limited thereby.

EXAMPLE

Humid air at 90° F. is compressed in compressor 11 at a rate of 554 lb./hour to 60 p.s.i.g. The compressed humid air in line 12 is partially cooled in exchanger 14 by heat exchange with dehumidified air in line 21 and is further cooled by water in exchange 15 to a temperature of 100° F. before entering the dehumidifier 17. In the dehumidifier, the water content in the air is reduced to substantially zero. Liquid sulfur dioxide from storage in line 20 is added at a rate of 64 lb./hour to a portion of the dehumidified air in line 19 prior to its entering the heat exchanger 14 where its temperature is raised to 300° F. The gaseous mixture in line 22 is then passed through the converter product exchanger 23 where it is heated to a temperature of 800° F. before entering the converter 25. In the converter 25, sulfur dioxide is substantially completely converted in the presence of a vanadium oxide catalyst to sulfur trioxide. The gaseous products leaving the converter 25 in line 27 are cooled in exchanger 23 to a temperature of 520° F., a temperature high enough to avoid sulfuric acid condensation. The temperature in converter 25 is controlled by introducing the remaining portion of the compressed air in line 26 to converter 25.

The effectiveness of the electrostatic precipitator to remove fly ash from a flue gas formed by the combustion of a low sulfur fuel is improved from a collection efficiency of about 65% to better than 95% by the method of this invention.

In a preferred embodiment, the total amount of sulfur trioxide present at any time is that quantity in the gaseous products from the zone of sulfur trioxide formation in the converter 25 to the zone of injection into the flue gas. Sulfur trioxide is added at a rate to provide between about 15 to 25 parts per million parts of flue gas being passed to the electrostatic precipitators. It is readily apparent that the process of this invention eliminates the hazards attendant with the storage and handling of liquid sulfur trioxide.

While the preceding description of the invention has been based upon the use of liquefied sulfur dioxide as the starting material it is readily apparent that other sulfur-containing materials may be used. If sulfur in another form is used, a reactor is provided to convert the sulfur-bearing material to gaseous sulfur dioxide. Thus, sulfur dioxide may be obtained by the combustion of $H_2S$ (hydrogen sulfide) or of organic sulfur compounds, such as mercaptans, sulfides and the like. The use of any such starting material would be governed by the conditions prevailing at any given location. For power plant applications, however, liquefied sulfur dioxide would be the preferred starting material thereby reducing equipment requirements.

I claim:

1. A process for treating flue gas to facilitate fly ash removal therefrom by electrostatic means wherein said flue gas is produced in a plant by the combustion of a fossil fuel which comprises:
    (a) admixing during the operation of said plant gaseous sulfur dioxide with a stoichiometric excess of compressed air, said resulting air-sulfur dioxide mixture containing less than about five volume percent sulfur dioxide;
    (b) preheating the gaseous mixture of step (a) to a temperature of from about 750° to 930° F.;
    (c) introducing the preheated gaseous mixture of step (b) into reaction zone wherein said sulfur dioxide is converted to sulfur trioxide;
    (d) withdrawing the gaseous products including sulfur trioxide from said reaction zone;
    (e) passing said gaseous products to a distribution zone; and
    (f) introducing said gaseous products into said flue gas prior to passage thereof through said electrostatic means, the amount of sulfur trioxide in said process between said reaction zone and said distribution zone not exceeding the value given by the equation $$G = 1000 T^{0.5}$$

wherein G is the number of grains of sulfur trioxide and T is the number of pounds per hour of sulfur trioxide introduced into the flue gas.

2. The process as defined in claim 1 wherein compressed air is dehumidified and divided into two portions, one portion thereof constituting the air admixed with said sulfur dioxide of step (a), the remaining portion thereof being introduced into said reaction zone separate from the gaseous mixture of step (b).

References Cited

UNITED STATES PATENTS

| 2,746,563 | 5/1956 | Harlow | 23—175 |
| 2,384,065 | 9/1945 | Balcar | 23—25 |
| 3,061,403 | 10/1962 | Rendos | 23—25 |
| 2,919,976 | 1/1960 | Feagan, Jr. | 23—25 |
| 3,455,652 | 7/1969 | James | 23—175 X |
| 3,581,463 | 6/1971 | Roberts | 23—175 X |

FOREIGN PATENTS

| 1,018,204 | 1/1966 | Great Britain | 23—25 |
| 678,217 | 1/1964 | Canada | 23—2 |

EARL C. THOMAS, Primary Examiner

U.S. Cl. X.R.

423—532; 55—4, 5